(12) United States Patent
Anderson

(10) Patent No.: US 7,189,457 B2
(45) Date of Patent: Mar. 13, 2007

(54) USE OF PET FILM PRIMED WITH POLYALLYLAMINE COATINGS IN LAMINATED GLASS GLAZING CONSTRUCTIONS

(75) Inventor: Jerrel C. Anderson, Vienna, WV (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 159 days.

(21) Appl. No.: 10/734,363

(22) Filed: Dec. 12, 2003

(65) Prior Publication Data

US 2005/0129954 A1 Jun. 16, 2005

(51) Int. Cl.
*B32B 27/08* (2006.01)
*B32B 27/30* (2006.01)
*B32B 27/36* (2006.01)
*B32B 27/40* (2006.01)
*B32B 37/02* (2006.01)

(52) U.S. Cl. .............................. 428/423.1; 428/423.7; 428/425.6; 428/426; 428/430; 428/441; 428/442; 428/480; 428/483; 428/515; 428/520; 428/522; 428/523; 156/297; 156/299; 156/306; 156/325; 156/327; 156/331.1

(58) Field of Classification Search ................ None
See application file for complete search history.

(56) References Cited

U.S. PATENT DOCUMENTS

| 5,069,942 | A | | 12/1991 | Anderson | |
|---|---|---|---|---|---|
| 5,411,845 | A | | 5/1995 | Robinson | |
| 5,415,942 | A | | 5/1995 | Anderson | |
| 5,690,994 | A | | 11/1997 | Robinson | |
| 5,698,329 | A | | 12/1997 | Robinson | |
| 5,700,560 | A | * | 12/1997 | Kotani et al. | 428/325 |
| 5,766,751 | A | * | 6/1998 | Kotani et al. | 428/323 |
| 5,770,312 | A | | 6/1998 | Robinson | |
| 5,969,029 | A | * | 10/1999 | Kotani et al. | 524/447 |
| 6,436,219 | B1 | * | 8/2002 | Francis et al. | 156/244.11 |
| 6,686,012 | B1 | * | 2/2004 | Molnar et al. | 428/36.91 |
| 2003/0087053 | A1 | * | 5/2003 | Fukushi | 428/36.91 |
| 2003/0108730 | A1 | * | 6/2003 | Francis et al. | 428/212 |
| 2003/0143371 | A1 | * | 7/2003 | Conway et al. | 428/136 |

FOREIGN PATENT DOCUMENTS

EP 0430054 6/1991
WO WO 99/61243 A1 12/1999

OTHER PUBLICATIONS

International Search Report from counterpart International Patent Application No. PCT/US2004/042266.
Written Opinion from counterpart International Patent Application No. PCT/US2004/042266.
Machine Translation of JP 05-331770 From Japan Patent Office Website.
Machine Translation of JP 06-128391 From Japan Patent Office Website.
European Patent Office Patent Abstracts of Japan for JP Publication No. 05-331770.
European Patent Office Patent Abstracts of Japan for JP Publication No. 06-128391.

* cited by examiner

*Primary Examiner*—Vivian Chen

(57) ABSTRACT

The present invention is a laminate comprising at least one layer of an polyallylamine-based coating that is and in direct contact with at least one other polymeric layer.

38 Claims, No Drawings

USE OF PET FILM PRIMED WITH POLYALLYLAMINE COATINGS IN LAMINATED GLASS GLAZING CONSTRUCTIONS

BACKGROUND OF THE INVENTION

1. Field of the Invention

This invention relates to laminates used in glazing applications. This invention particularly relates to a process for improving adhesion between layers in glazing laminates.

2. Description of the Related Art

Polyethylene terephtalate (PET) film can be used as a laminate layer in laminated glazing products. In such laminate products, the PET layer can be in contact with other polymeric layers of the laminate. Such commercial laminates as SENTRYGLAST™, and SPALLSHIELD™ products, which are laminate combinations of PVB and polyvinyl butyral available from DuPont, are examples. Imbedded film applications (for example, MET is PET imbedded between layers of PVB) are still other examples.

Glass/plastic laminates (that is, laminates having glass on one outer side and a hard plastic or hardcoated plastic on the other outer side) made using PVB interlayer with a PET film outer layer can be quite compressible because of the soft underlying PVB interlayer. Such laminates are vulnerable to gouges and impressions when hard objects impact them or are pressed against them for some time. If the impressions are deep, they can become permanent and this mars the appearance of glazing using such glass plastic laminates.

Harder interlayers would make the plastic side of glass/plastic laminates harder and less prone to gouging and pressure-induced impressions. However, use of such harder interlayers has been prevented by the lack of a sufficiently adherable PET film. For example, PET film treated by electrical discharge, various plasma treatments, or flame treatment does not adhere well to harder interlayers such as ionoplast sheeting, for example DuPont's SENTRY-GLAS™-PLUS (SGP) interlayer.

To obtain the PET laminates such as those described hereinabove, it can be necessary to flame treat the PET layer under controlled conditions to enhance its adhesion to PVB on one side and to a hardcoat such as a polysiloxane abrasion resistant coating (PARC) on the other side. The adhesion strength, as measured by the 90-degree angle peel test, averages about 10 lb/inch. The flame treatment is done in a separate operation from the PET film casting. U.S. Pat. No. 5,415,942 describes a hydroxy-acrylic hydrosol primer coating that, when applied to one side of a PET film, greatly improves adhesion of the PARC. However it does not improve adhesion of the PET to the PVB interlayer. Therefore the primed film still needs to be flame treated on the non-primed side.

Also, the adhesion between PVB and ionoplast resins is poor, and so laminates having these two polymer interlayers in contact are not viable for many of the applications in which these interlayer materials find use.

It can be desirable to have a primer that can improve adhesion of PET to PVB and/or ionoplast resins, and also improve adhesion between PVB and ionoplast resins.

SUMMARY OF THE INVENTION

In one aspect the present invention is a laminate comprising at least one layer of an polyallylamine-based coating that is adjacent to and in direct contact with at least one other polymeric layer comprising a polymer selected from the group consisting of: PET; PVB; ionoplast resin; polyurethanes; polyvinyl chlorides; polycarbonates; polyacetals; ethylene acid copolymers (which are inclusive of ethylene acid terpolymers); polyolefins, including polyethylenes and polypropylenes.

In another aspect, the present invention is a laminate comprising: a three-layer laminate structure comprising (1) a PET layer that is in contact with (2) a polyester film comprising a polyallylamine-based coating on each of its two surfaces, wherein the second surface is in direct contact with (3) a polyvinyl butyral (PVB) layer.

In another aspect, the present invention is a laminate comprising: a laminate structure comprising (1) an ionoplast resin layer that is in contact with (2) a polyvinyl butyral (PVB) layer, wherein the peel strength is at least 10 lb/inch between the ionoplast and the PVB layers and wherein at least one of the polymer layers comprises a polyester film comprising a polyallylamine-based coating on each of its two surfaces.

In another aspect, the present invention is a glass laminate comprising a three-layer laminate structure comprising: (1) a polymer selected from the group consisting of polyethylene terephthalate (PET); polyvinylbutyral (PVB); and ethylene acid copolymer ionomer (ionoplast resin), said polymer being in contact with (2) an polyallylamine-based coating that is in contact with (3) a polymer selected from the group consisting of PET; PVB; ionoplast resin; polyurethanes; polyvinyl chlorides; polycarbonates; polyacetals; ethylene acid copolymers (which are inclusive of ethylene acid terpolymers); polyolefins, including polyethylenes and polypropylenes. In another aspect, the present invention is a process for preparing a laminate comprising the steps of: (1) applying a polyester film having a coating of polyallylamine-based polymer (PRIMER) to at least one surface of a polymer selected from the group consisting of: polyethylene terphthalate (PET); polyvinylbutyral (PVB); and ethylene acid copolymer ionomer (ionoplast resin); and (2) contacting the coated polyallylamine coated surface with at least one polymeric layer selected from a polymer in the group consisting of: PET; PVB; ionoplast resin; polyurethanes; polyvinyl chlorides; polycarbonates; polyacetals; ethylene acid copolymers (which are inclusive of ethylene acid terpolymers); polyolefins, including polyethylenes and polypropylenes wherein the PRIMER is applied in-line with the polymer sheet, and wherein the PRIMER has been heated to a temperature above about 170° C. and stretched before application to the polymer surface.

DETAILED DESCRIPTION OF THE INVENTION

In one embodiment, the present invention is a polymer which has adhered to at least one of its surfaces a polyester (PET) layer wherein the PET has a coating of a polyallylamine-based primer applied to at least one of its surfaces, preferably to both surfaces of the PET. The primer and its application to the PET polymeric layer are described in U.S. Pat. Nos. 5,411,845; 5,770,312; 5,690,994; and 5,698,329. Generally, the PET film is extruded and cast as a film by conventional methods, and the polyallylamine coating is applied to the PET film either before stretching or between the machine direction stretching and transverse direction stretching operations, and/or after the two stretching operations and heat setting in the stenter oven. It is preferable that the coating be applied before the transverse stretching operation so that the coated PET web is heated under restraint to a temperature of about 220° C. in the stenter oven in order to cure the polyallylamine to the PET surface. In addition to this cured coating, an additional polyallylamine coating can be applied on it after the stretching and stenter oven heat setting in order to obtain a thicker overall coating. The coated PET treated in this general manner is the primer (PRIMER) used herein to enhance the adhesion between dissimilar polymeric layers in a laminate construction.

Adhesive strength in a laminate of the present invention is determined by the 90° peel test. The adhesive strength between dissimilar polymer layers in the present invention can be about zero (0) to about less than 10 lb/inch without any treatment to enhance adhesion, and with flame treatment the adhesive strength can be improved to about 10 lb/inch. Using a PRIMER as described herein can improve the peel strength to at least about 10 lb/in, and preferably to at least 15 lb/inch.

Suitable polymers useful in a laminate of the present invention include, for example: PET; PVB; ionoplast resins, which are ethylene acid copolymer ionomers; polyurethanes; polyvinyl chlorides; polycarbonates; polyacetals; ethylene acid copolymers (which are inclusive of ethylene acid terpolymers); polyolefins, including polyethylenes and polypropylenes. Preferred for use herein are polymers that are transparent, or that can be made to be transparent, such that they are suitable for use in glazing end-use applications. Particularly preferred for use herein are PET, PVB, and ionoplast resins.

PVB is a commercially available product that can be obtained from E.I. DuPont de Nemours and Company (DuPont) under the tradename of Butacite®. Ionoplast resins suitable for use herein are copolymers (inclusive of terpolymers) of ethylene and unsaturated carboxylic acids wherein at least a portion of the acid groups in the copolymer have been neutralized to the salt form of the acid. Extruded sheets of ionoplast resin suitable for use in the present invention can be obtained from DuPont under the trade name of SentryGlass® Plus (SGP).

Polyester films (PET) are well-known polymer films that can also be obtained commercially from DuPont. PET suitable for use herein can additionally comprise a hardcoat such as an abrasion resistant polysiloxane material or an oligomeric coating as described in U.S. Application Ser. No. 60/499,949 on one of its surfaces. The polysiloxane coated PET can be obtained commercially from DuPont. In laminates of PET and other polymers such as PVB and SGP, it can be conventional to enhance the adhesion of the PET to the other polymers by some treatment step such as a flame treatment. In the practice of the present invention, adhesion of PET to any of the other polymers can be improved by applying the PRIMER to either surface of the dissimilar polymers prior to laminating the layers using conventional laminating methods. Use of the PRIMER to improve the adhesion to PVB can eliminate the need for a flame treatment to obtain suitable adhesion between these polymers, for example.

In another preferred embodiment, the adhesion between PVB and ionoplast resin can be greatly improved by applying the PRIMER to the surface of either polymer layer prior to lamination. A laminate can be constructed wherein ionoplast resin and PVB are adhered using the PRIMER and thus provide a [Glass/PVB/PRIMER/ionoplast/PRIMER/PVB/Glass] laminate, for example, having enhanced penetration resistance relative to conventional Glass/PVB/Glass laminates, without losing the desirable properties of the conventional PVB glass laminates.

Laminated polymer layers comprising the PRIMER can be used in the construction of other multilayer laminates. For example, the laminate constructions obtained from PET/PRIMER/PVB can be laminated to glass, or between other polymeric layers, or a combination thereof. A PET layer can comprise a hardcoat on its surface, and thus be used in glass/plastic product applications such as where Spallshield® or SentryGlass® laminated products find use. Alternatively, the laminate can be imbedded between other polymeric laminate layers without the hardcoat on the surface of the PET. The PRIMER adheres very well to both PVB resins and ionoplast resins, and this makes possible its use with either interlayer in glass plastic glazing.

In one embodiment, the PRIMER can be used to adhere PVB having a low plasticizer content, and thus higher-modulus, to "normal" PVB or to other polymeric interlayer materials as defined herein.

Generally, laminates of the present invention can be useful in architectural as well as in vehicular applications. For example, the laminates of the present invention can be useful as windows in buildings, doors, shelves, display cabinets, partitions, as hurricane windows, bullet-resistant glazings, sidelites and windshields in automobiles, windows in planes and trains, and other applications where laminated glazings can be used.

EXAMPLES

The Examples and Comparative Examples are presented for illustrative purposes only, and are not intended to limit the scope of the present invention in any manner.

Example 1

Four PET films primed in-line with three different primer coatings along with a flame treated PET film as control, were laminated to glass with the primed sides against high adhesion grade BUTACITE™ BE-1028 PVB sheeting. The PET films were then tested for peel adhesion strength against the PVB sheeting. These samples were laminated to glass using an air autoclave at a temperature of 135° C. held for 30 minutes at a pressure of 17 atmospheres. The samples were vacuum bagged to remove air from between the PET and PVB and glass layers. A glass cover plate was used to maintain optical flatness and to insure complete contact between all layers. This cover plate was removed from the PET side of each laminate after the autoclaving step. The primed films were various grades of polyester films. The PET film used for the PRIMER was primed in-line on both sides with a crosslinked polyallylamine coating, the second PET film used as a comparative (PETC1) was primed on one side in-line with a crosslinked acrylic hydrosol coating containing acrylamide functionality, and two other comparative PET films (PETC2 and PETC3) primed in-line on one side with a crosslinked 2-hydroxyethylacrylate functionalized acrylic hydrosol coating, available from DuPont, both single coating and stretched and double coated. The flame treated control film was PETC4, and is the same PET film base as used in the PETC2 and PETC3 primed examples, except that instead of priming it was flame treated in a separate operation from the film making process, i.e. not flame treated in-line.

The finished laminates were clear and suitable for 90 degree angle peel testing. The laminate structure was: PET/PVB/GLASS.

The laminates were peeled at a 90-degree angle using an INSTRUMENTORS, Inc., Model SP-102B-3M90 SLIP/PEEL Tester. The laminates were peeled at rates of 1 inch and 2 inches per minute. The peel test results are tabulated below:

TABLE 1

| PET FILM TYPE | 90 Degree Peel Strength (lb/inch) |
|---|---|
| [a]Flame Treated (PETC4) | 10.2 |
| [a]Acrylamide primed (PETC1) | 0.2 |
| [a]Hydroxyacrylic Single Primed (PETC2) | 0.0 |
| [a]Hydroxyacrylic Double Primed (PETC3) | 0.0 |
| [b]Polyallylamine Primed (PRIMER) | >50.0 |

[a]Not an example of the present invention.
[b]Exceeded load cell capability, i.e. did not peel at all.

The only primer that enhanced adhesion between the PET film and PVB sheeting was the polyallylamine. The adhesion was too high to measure.

Example 2

This example is the same as Example 1, but with these changes: (1) 95 mil thick SENTRYGLAS™-PLUS ionoplast sheeting was used as the interlayer instead of PVB, and (2) PRIMER and PETC4 were the only PET films tested. The 90-degree peel results are tabulated below:

TABLE 2

| PET Film Type | 90 Degree Angle Peel Strength (lb/inch) |
|---|---|
| [a]PETC4 | 0.062 |
| PRIMER | >48.7 |

[a]Not an example of the present invention.

The adhesion between the polyallylamine primed PET film and the SGP resin sheet exceeded the capacity of the peel tester load cell. The result reported is the limit of the load cell.

Example 3

Laminated glass panels imbedding PET films were made and tested for compressive shear strength. The structures tested were these:

Structure A:
GLASS/PVB/PET/PVB/GLASS (PVB layers 30 mils thick)

Structure B:
GLASS/PVB/PET/PVB/PET/PVB/GLASS (PVB layers each 15 mils thick)

Two PET films were tested for compressive shear strength (CSS): (1) PETC4 (7 mil thick), and (2) 6.50 mil thick PRIMER film.

The compressive shear strengths of the laminates described herein were determined using the method described in WO9961243(A1) and detailed here. 1"×1" (25 mm×25 mm) chips are sawed from the laminate and conditioned in a room controlled at 23° C.±2° C. and 50%±1% relative humidity for one hour prior to testing. The chip to be tested was placed in the apparatus. A cross-head is lowered at the rate of 0.1 inch per minute (2.5 mm per minute) until it contacts the upper piece of the device. As the cross-head continues to travel downward, it causes adhesive failure in the chip. The compressive shear strength of the chip is the shear stress required to cause adhesive failure. The precision of this test is such that one standard deviation is typically 6% of the average result of six chips.

Controls were also tested, and these used the same thicknesses of PVB but with no imbedded PET films. These laminates were also measured for haze and transmission in the visible region. The test results are tabulated below:

TABLE 3

| Laminate Structure | Haze (%) | $T_{vis}$ (%) | CSS (psi) |
|---|---|---|---|
| [a,1]Glass/60 milPVB/glass | 0.38 | 90.1 | 2,310 |
| [a,2]A | 0.78 | 89.4 | 722 |
| [b]A | 0.95 | 88.9 | 3,170 |
| [a,1]Glass/45 milPVB/glass | 0.36 | 90.2 | 1,714 |
| [a,2]B | 0.94 | 8.5 | 614 |
| [b]B | 1.48 | 82.8 | 2,388 |

[a]Not an example of the present invention.
[b]PRIMER
[1]No PET present in laminate.
[2]PETC4

The use of the polyallylamine primer on both sides of the PET films greatly improved the laminate shear strength over that seen with flame treated PET film and even over that seen in laminates made without any imbedded film.

Example 4

Imbedded film laminates with the structure given below were made using an autoclave cycle of 135C at 200 psi for 30 minutes with the use of vacuum bags:
GLASS/INTERLAYER/FILM/INTERLAYER/GLASS The films used were PRIMER film (primed on both sides) and PETC4, flame treated on both sides. Interlayers used were BE-1028 BUTACITE™ PVB and SENTRYGLAS™-PLUS ionoplast, both mixed and as sole types in the laminates. The interlayer sheets were 30 mils thick and the films were 6.5–7.0 mils thick.

The laminates were evaluated for compressive shear strength, haze, transmission, and color. The results are given below:

TABLE 4

| Laminate Structure | Haze (%) | $T_{vis}$ (%) | CSS (psi) | Color L* | Color b* | Color YID |
|---|---|---|---|---|---|---|
| [a]G/PVB/PVB/G | 0.53 | 90.6 | 3,581 | 95.61 | 1.13 | 0.64 |
| [a]G/PVB/PET/PVB/G | 0.74 | 89.5 | 1,380 | 95.15 | 1.55 | 1.41 |
| G/PVB/PR*/PVB/G | 0.92 | 89.1 | 3,900 | 94.94 | 1.89 | 2.00 |
| [a]G/SGP/SGP/G | 1.43 | 90.1 | 4,040 | 95.31 | 0.97 | 0.49 |
| [a]G/SGP/PET/SGP/G | 1.69 | 89.4 | 3,867 | 94.94 | 1.38 | 1.20 |
| G/SGP/PR*/SGP/G | 1.97 | 89.2 | 4,365 | 94.80 | 1.63 | 1.69 |
| [a]G/SGP/PVB/G | 1.19 | 90.2 | 372 | 95.36 | 1.03 | 0.50 |
| [a]G/SGP/PET/PVB/G | 1.29 | 89.3 | 1,812 | 94.97 | 1.51 | 1.38 |
| G/SGP/PR*/PVB/G | 1.46 | 89.0 | 1,793 | 94.83 | 1.81 | 1.91 |

[a]Not an example of the present invention.
Notes:
G = GLASS (90 mils thick and annealed);
PET = flame treated 7.0 mil thick PET film (PETC4)
PR* = PET film primed on both sides with polyallylamine crosslinked coating (PRIMER).

Comments on the Data in Table 4

PVB/SGP/Film Hybrid Laminates:
  The data show the poor adhesion between PVB and SGP where the CSS was only 372 psi and the shearing took place at the interface between the PVB and the SGP. Both the PETC4 and PRIMER films improved the CSS about equally. The shearing took place at the glass/SGP interface for the PRIMER laminates and at the PET/SGP for the PETC4 laminates.

PVB/Film Laminates:

Using the imbedded PRIMER film apparently increases the CSS and using the flame treated PET film reduces the CSS relative to using no intermediate layer between the PVB.

SGP/film laminates:

The shearing took place at the SGP-to-glass interfaces.

Example 5

SENTRYGLAS™/SPALLSHIELD™ laminates were made using flame treated PET film and PRIMER films by coating each film on one side with polysiloxane abrasion resistant hardcoat followed by lamination to glass in an autoclave at 135° C. for 30 minutes at a pressure of 17 atmospheres using vacuum bags.

A polysiloxane abrasion resistant coating (PARC) solution was made by the technique described in U.S. Pat. No. 5,069,942 and was coated onto the films using a "RESOURCE I" bench top lab coater (sold by BYK-Gardner, Inc.) fitted with a #16 wire-wound coating rod which gave a PARC coating measuring about 2.5 microns in dried thickness. The coating was allowed to dry at room temperature, and then the coated films were laminated to glass using an air autoclave and a removable coverplate that acted to insure optically flat laminates. The interlayer materials used were 30 mil SENTRYGLAS™-PLUS ionoplast and 30 mil BUTACITE™ PVB.

The product laminates were measured for optical properties and abrasion resistance using the Taber Abrader (ANSI Z26.1 Standard, Test No. 34) method. The laminates were then immersed in boiling water for 6 hours followed by testing again for optical properties (ASTM D 1003-61), PARC adhesion (D 3359-87), micro-blistering, and PET-to-interlayer adhesion (peel testing). The results are tabulated below in Table 5.

laminates were vacuum bagged followed by heating in an autoclave at 135° C. for 30 minutes at temperature and 200 psi pressure.

These laminates were tested for pressure-induced impressions by pressing against them a weighted steel stylus having a spherical head with a radius of 0.50 mm. The stylus was pressed normal against the plastic sides of the two samples at a given weight for 1 minute, and then the stylus was removed and the laminates were allowed to sit at room temperature (73° F.) for one hour before measuring the depths of the resulting impressions. The impression depths were measured by measuring the width of the circular shaped impressions and then calculating the depth assuming this impression width was the chord on a circle measuring 1.00 mm in diameter (the diameter of the spherical stylus head).

The results are tabulated in Table 6. Neither laminate suffered lasting impressions at a weight of 246 grams, but with a weight of 501 grams both developed measurable impressions, but the one on the laminate using the ionoplast interlayer was not visible to the unaided eye whereas the one on the laminate using PVB interlayer was visible. As the weight on the stylus was increased, the impressions became deeper and more visible, but two differences were noted in the way the two laminates behaved: (1) the laminates with PVB interlayer depressed more deeply at any given weight than those with SGP interlayer, and (2) the laminates with PVB interlayer took the circular stylus impression, but they also formed very broad depressions surrounding them; i.e. the surface formed wide impressions with a center core impression from the stylus itself, while the laminates containing the SGP interlayer only deformed at the stylus location with no broad ancillary surrounding depression.

The laminates using SGP ionoplast resin interlayer were much harder and more resistant to deformation than those using the softer PVB interlayer.

TABLE 5

| Construction | Treatment[a] | PET peel Strength (lb/inch) | Gloss 20° | ΔHaze (%) | $T_{vis}$ (%) | YID Haze | Taber Abrasion (%) | PARC Adhes. Retention (%) | Blisters (no./cm²/ dia mm) |
|---|---|---|---|---|---|---|---|---|---|
| [1]G/PVB/PET | (1) | 10.2 | 87.6 | 0.85 | 92.3 | 1.35 | 1.8 | 100 | none |
|  | (2) | 0.0 | — | 1.03 | 92.3 | 1.32 | — | 94 | 240/.08 |
| G/PVB/PR* | (1) | >50 | 88.8 | 0.98 | 91.8 | 1.89 | 1.5 | 100 | none |
|  | (2) | >50 | — | 1.28 | 92.2 | 1.79 | — | 100 | 65/.11 |
| [1]G/SGP/PET | (1) | 0.06 | 90.4 | 1.02 | 92.3 | 1.18 | 0.8 | 100 | none |
|  | (2) | 0.0 | — | 7.76 | 83.4 | 1.03 | — | 100 | 340/.08 |
| G/SGP/PR* | (1) | >50 | 88.7 | 1.28 | 91.9 | 1.64 | 1.4 | 100 | none |
|  | (2) | >50 | — | 2.47 | 89.1 | 4.62 | — | 100 | 52/.14 |

[a](1) = As made; (2) = 6-hour boil.
[1]Not an example of the present invention.
G = 90 mil annealed glass;
PET = flame treated PET film, 7.0 mils thick (PETC4)
PR* = PET film primed on both sides with polyallylamine coating (PRIMER).

Example 6

Two laminates were made with 6.5 mil PRIMER film: (A) structure "A" used 30 mil BUTACITE™ PVB sheeting and the 6.5 mil primed PET, and (B) structure "B" was made using 60 mil SENTRYGLAS™-PLUS ionoplast interlayer and the 6.5 mil primed PET. Both laminates were made with the GLASS/INTERLAYER/PET construction and a removable cover plate of 90 mil glass was used against the plastic side of the laminates to give it an optically flat surface. The

TABLE 6

Impressibility of SPALLSHIELD ™ Laminates using PVB and SGP as Interlayers

| Weight on Stylus | Impression Depth (mm) | |
|---|---|---|
| (grams) | SGP Interlayer | PVB Interlayer |
| 246 | 0.0000 | 0.0000 |

TABLE 6-continued

Impressibility of SPALLSHIELD ™ Laminates using PVB and SGP as Interlayers

| Weight on Stylus (grams) | Impression Depth (mm) | |
|---|---|---|
| | SGP Interlayer | PVB Interlayer |
| 501 | 0.0098 | 0.0180 |
| 647 | 0.0122 | 0.0289 |
| 787 | 0.0173 | 0.0382 |

TABLE 6-continued

Impressibility of SPALLSHIELD ™ Laminates using PVB and SGP as Interlayers

| Weight on Stylus (grams) | Impression Depth (mm) | |
|---|---|---|
| | SGP Interlayer | PVB Interlayer |
| 884 | 0.0199 | 0.0430 |
| 980 | 0.0227 | 0.0526 |

Example 7

The use of polyallylamine primed PET film in SP/SG laminates allows the use of SGP as the interlayer instead of PVB, and, as described above, it gives a harder plastic side to the laminates that is more resistant to dents and dings from rough handling. But it also gives a stiffer laminate post breakage, and so should perform well in the hurricane test from both the impact and pressure cycling aspects.

Two SGP based SP/SG laminates were tested for impact performance using a bull-nosed pendulum impactor that weighed 70.12 lbs. The nose is of steel and is hemispheric with a 3" diameter rounded head. The 12"×12" laminates were securely fastened in a vertical steel frame with rubber gasketing. Impact energy is determined by the height of the impactor above the center of the laminate at the release point. The impactor height was increased until it fully penetrated the laminate and this was the Height reported in the Table below, and the penetration energy (reported in the Table below) was calculated using this height and the weight of the impactor.

The two SGP-based laminates used 60 mil SENTRY-GLAS™-PLUS interlayer. One used 7.0 mil thick CRONAR™732C film that was flame treated, and the other one used 6.5 mil PRIMER film that was primed in-line with polyallylamine coating. The results are shown in Table 7.

TABLE 7

Pendulum Impact Test Results on Glass/Plastic Laminates and Hybrid Laminates Containing Different PET Films and Either SGP and/or PVB Interlayers

| Sample | Laminate Construction | PET Film Type | PVB Type | Ionoplast (SGP) | Energy (ft-lbs) | Ht (ft) |
|---|---|---|---|---|---|---|
| AA[a] | GLASS/PVB/PET | PETC4[1] | BE-1030[3] | none | 1.92 | 135 |
| BB[a] | GLASS/PVB/PET | PETC5[2] | BE-1030[3] | none | 1.92 | 135 |
| CC | GLASS/PVB/PET | PRIMER[4] | BE-1030[3] | none | 2 | 140 |
| DD[a] | GLASS/SGP/PET | PETC4[1] | none | 60 mil | 2.58 | 181 |
| EE | GLASS/SGP/PET | PRIMER[4] | none | 60 mil | 3.75 | 263 |
| GG | GLASS/PVB/PET/SGP/PET | PRIMER[4] | BE-1030[3] | 60 mil | >5.75 | >403 |
| HH[a] | GLASS/PVB/SGP/PVB/GLASS | none | BE-1030 (30 mil) | 60 mil | 4.08[5] | 286 |
| JJ[a] | GLASS/PVB/PET/SGP/PET/PVB/GLASS | PETC4[1] | BE-1030 (30 mil) | 60 mil | 4.75 | 333 |
| KK | GLASS/PVB/PET/SGP/PET/PVB/GLASS | PRIMER[4] | BE-1030 (30 mil) | 60 mil | 4.67 | 327 |

[1]7 mil thick film that has standard flame treatment on both sides.
[2]7 mils thick and has no surface treatment for adhesion improvement.
[3]BE-1030 is high adhesion grade PVB available from DuPont.
[4]6.5 mils thick and primed in-line.
[5]Laminate suffered massive delamination between PVB and SGP interlayers.
[a]Not an example of the present invention.

Example 8

Polyallylamine primed PET film also makes possible hybrid SP/SG laminate structures wherein SGP and PVB can be used in the same laminate with the primed film acting as the adhesive layer attaching them strongly together. The PET also adds its high strength and stiffness to the total structure as well. Such a structure is included in the table used in Example 7 as Sample "GG". This structure could not be penetrated below 400 ft-lbs, and was not penetrated in this test.

What is claimed is:

1. A laminate comprising: (1) a first polymer layer comprising a polymer selected from the group consisting of polyvinyl butyral; ethylene acid copolymer ionomers; polyurethanes; polyvinyl chlorides; polyacetals; and ethylene acid copolymers that is adjacent to and adhered to (2) a first polyester film layer comprising a polyester film that has been coated on both sides with polyallylamine coating, wherein the first polyester film layer is additionally adjacent to and adhered to (3) a second polymer layer comprising a polymer selected front the group consisting of polyvinyl butyral; ethylene acid copolymer ionomers; polyurethanes; polyvinyl chlorides; polyacetals; and ethylene acid copolymers, wherein the second polymer layer is additionally adjacent to and adhered to (4) a second polyester film layer comprising a polyester film that has been coated on both sides with a polyallylamine coating, wherein the second polyester film layer is additionally adjacent to and adhered to (5) a third polymer layer comprising a polymer selected from the group consisting of polyvinyl butyral; ethylene acid copolymer ionomers; polyurethanes; polyvinyl chlorides; polyacetals; and ethylene acid copolymers.

2. The laminate of claim 1 wherein the polymer of the first polymer layer and the third polymer layer are the same polymer.

3. The laminate of claim 1 wherein the polymer of the first polymer layer is selected from the group consisting of the ethylene acid copolymer ionomers and the polymer of the third polymer layer is selected from the group consisting of the ethylene acid copolymer ionomers.

4. The laminate of claim 1 wherein the polymer of the second polymer layer is selected from the group consisting of the ethylene acid copolymer ionomers and the polymer of the first and third polymer layers is the polyvinyl butyral.

5. The laminate of claim 1 wherein polymer of the first polymer layer is the polyvinyl butyral.

6. The laminate of claim 1 wherein the polymer of the first polymer layer is selected front the group consisting of the ethylene acid copolymer ionomers.

7. The laminate of claim 1 wherein the laminate is a glass laminate and the first polymer layer is laminated to the glass.

8. The laminate of claim 7 wherein the third polymer layer is also laminated to glass.

9. The laminate of claim 8 wherein the polymer of the first polymer layer is the polyvinyl butyral; the polymer of the second polymer layer is selected from the group consisting of the ethylene acid copolymer ionomers; and the polymer of the third polymer layer is the polyvinyl butyral.

10. The laminate of claim 9 wherein the polyester film of the first polyester film layer and the second polyester film layer is polyethylene terephthalate film.

11. The laminate of claim 1 wherein the polyester film of the first polyester film layer and the second polyester film layer is polyethylene terephthalate film.

12. A laminate comprising: (1) an ethylene acid copolymer ionomer polymer layer that is in direct contact with (2) a polyester film that has been coated on both sides with a polyallylamine coating, wherein the coated polyester film is additionally in direct contact with (3) a polyvinyl butyral polymer layer, wherein the 90 degree peel strength is at least 15 lb/inch for the polymer layers.

13. An article selected from the group consisting of: automobiles, display cabinets, trains, airplanes, boats, and buildings, comprising a laminate comprising a layer of a polyester film that has been coated with a polyallylamine coating that is adjacent to, and in direct contact with, at least one other polymeric layer comprising a polymer selected from the group consisting of: polyvinyl butyral; ethylene acid copolymer ionomers: polyurethanes; polyvinyl chlorides; polyacerals; and ethylene acid copolymers, wherein the polyallylamine coating adheres the polyester film to the at least one other polymeric layer.

14. An article wherein the article is an article selected from the group consisting of: windows, stairs, ceilings, walls and skylights, comprising a laminate comprising layer of a polyester film that has been coated with a polyallylamine coating that is adjacent to, and in direct contact with, at least one other polymeric layer comprising a polymer selected from the group consisting of: polyvinyl butyral; ethylene acid copolymer ionomers; polyurethanes; polyvinyl chlorides; polyacetals; and ethylene acid copolymers, wherein the polyallylamine coating adheres the polyester film to the at least one other polymeric layer.

15. A glass laminate comprising: (a) a layer of a polyester film that has been coated with a polyallylamine coating that is adjacent to, and adhered to, (b) a polymer layer comprising a polymer selected from the group consisting of polyvinyl butyral; ethylene acid copolymer ionomers; polyurethanes; polyvinyl chlorides; polyacetals; and ethylene acid copolymers, wherein, the polymer layer is laminated to the glass.

16. The laminate of claim 15 wherein the polyester film is a polyethylene terephthalate film.

17. The laminate of claim 16 wherein the polymer is the polyvinyl butyral.

18. The laminate of claim 16 wherein the polymer is selected from the group consisting of the ethylene acid copolymer ionomers.

19. A laminate comprising: (1) a first polymer layer comprising a polymer selected from the group consisting of polyvinyl butyral; ethylene acid copolymer ionomers; polyurethanes; polyvinyl chlorides; polyacetals; and ethylene acid copolymers that is adjacent to and adhered to (2) a polyester film layer comprising a polyester film that has been coated on both sides with polyallylamine coating, wherein the polyester film layer is additionally adjacent to and adhered to (3) a second polymer layer comprising a polymer selected from the group consisting of polyvinyl butyral; ethylene acid copolymer ionomers; polyurethanes; polyvinyl chlorides; polyacetals; and ethylene acid copolymers.

20. The laminate of claim 19 wherein the polyester film is a polyethylene terephthalate film.

21. The laminate of claim 20 wherein the polymer of the first polymer layer and the polymer of the second polymer layer are not the same polymer.

22. The laminate of claim 20 wherein the polymer of the first polymer layer is the polyvinyl butyral and the polymer of the second polymer layer is selected from the group consisting of the ethylene acid copolymer ionomers.

23. The laminate of claim 22 wherein the first polymer layer is adjacent to and adhered to a polyester film layer comprising a polyester film that has been coated on the side adjacent to the first polymer layer with a polyallylamine coating and which is coated on the other side with a hardcoat.

24. The laminate of claim 20 wherein the first polymer layer is adjacent to and adhered to a polyester film layer comprising a polyester film that has been coated on the side adjacent to the first polymer layer with a polyallylamine coating and which is coated on the other side with a hardcoat.

25. The laminate of claim 24 wherein the laminate is a glass/plastic laminate and the second polymer layer is laminated to the glass.

26. The laminate of claim 25 wherein the hardcoat is a polysiloxane abrasion resistant coating.

27. The laminate of claim 26 wherein the laminate is a glass/plastic laminate and the polymer layer is laminated to the glass.

28. The laminate of claim 27 wherein the polymer is selected from the group consisting of the ethylene acid copolymer ionomers.

29. The laminate of claim 19 wherein the polyallylamine coating was applied in-line with the polyester film.

30. A process for preparing a laminate as claimed in claim 19 comprising the steps of:

(a) providing a first polymer sheet comprising a polymer selected from the group consisting of polyvinyl butyral;

ethylene acid copolymer ionomers; polyurethanes; polyvinyl chlorides; polyacetals; and ethylene acid copolymers;

(b) providing a polyester film layer coated on both sides with polyallylamine;

(c) providing second polymer sheet comprising a polymer selected from the group consisting of polyvinyl butyral; ethylene acid copolymer ionomers; polyurethanes; polyvinyl chlorides; polyacetals; ethylene acid copolymer sheet; and (d) contacting the polyester film to the first polymer sheet and the second polymer sheet; and (e) adhering the polyester film to the first polymer sheet and the second polymer sheet by heating.

31. The process of claim 30, wherein the first polymer sheet is selected from the group consisting of polyvinyl butyral sheet and ethylene acid copolymer ionomer sheet and the second polymer sheet is selected from the group consisting of polyvinyl butyral sheet and ethylene acid copolymer ionomer sheet.

32. The process of claim 31 wherein the polyester film is a polyethylene terephthalate film.

33. A laminate comprising: (1) a polymer layer comprising a polymer selected from the group consisting of polyvinyl butyral; ethylene acid copolymer ionomers; polyurethanes; polyvinyl chlorides; polyacetals; and ethylene acid copolymers that is adjacent to and adhered to (2) a polyester film layer comprising a polyester film that has been coated on the side adjacent to the polymer layer with a polyallylamine coating and which is coated on the other side with a hardcoat.

34. The laminate of claim 33 wherein the polyester film is a polyethylene terephthalate film.

35. A laminate comprising: (1) a polymer layer comprising a polymer selected from the group consisting of polyvinyl butyral; ethylene acid copolymer ionomers; polyurethanes; polyvinyl chlorides; polyacetals; and ethylene acid copolymers that is adjacent to and adhered to (2) a polyester film layer comprising a polyester film that has been coated on both sides with a polyallylamine coating and which is further coated on the side opposite the polymer layer with a hardcoat.

36. The laminate of claim 35 wherein the hardcoat is a polysiloxane abrasion resistant coating.

37. The laminate of claim 36 wherein the polyester film is a polyethylene terephthalate film.

38. The laminate of claim 37 wherein the laminate is a glass/plastic laminate and the polymer layer is laminated to the glass.

* * * * *